(12) United States Patent
Magno, Jr.

(10) Patent No.: US 7,210,506 B2
(45) Date of Patent: May 1, 2007

(54) CYCLE COUNTER FOR CABLE TIE TOOL

(75) Inventor: Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 125 days.

(21) Appl. No.: 11/055,938

(22) Filed: Feb. 11, 2005

(65) Prior Publication Data

US 2005/0178460 A1 Aug. 18, 2005

Related U.S. Application Data

(60) Provisional application No. 60/544,472, filed on Feb. 13, 2004.

(51) Int. Cl.
  B21F 9/00 (2006.01)
  B21F 9/02 (2006.01)
(52) U.S. Cl. .................................. 140/123.6; 140/93.2
(58) Field of Classification Search ................ 140/124, 140/123.6, 93.2; 100/33 PB; 83/522.29
  See application file for complete search history.

(56) References Cited

U.S. PATENT DOCUMENTS

| | | | | |
|---|---|---|---|---|
| 3,550,493 A | * | 12/1970 | Benbenek et al. | 83/522.29 |
| 3,706,248 A | * | 12/1972 | Erhart | 83/522.29 |
| 3,722,335 A | * | 3/1973 | Labonte et al. | 83/522.29 |
| 3,834,262 A | * | 9/1974 | Lapper | 83/522.29 |
| 4,598,740 A | * | 7/1986 | Sloan et al. | 140/124 |
| 4,790,225 A | | 12/1988 | Moody et al. | |
| 4,862,928 A | | 9/1989 | Caveney et al. | |
| 5,146,847 A | | 9/1992 | Lyon et al. | |
| 5,365,723 A | | 11/1994 | Ramos et al. | |
| 5,595,220 A | | 1/1997 | Leban et al. | |

(Continued)

FOREIGN PATENT DOCUMENTS

EP 0 311 147 A 4/1989

(Continued)

OTHER PUBLICATIONS

European Search Report, including Annex, for European Patent Application No. EP 05 07 5355 (2 pages).

(Continued)

*Primary Examiner*—Lowell A. Larson
*Assistant Examiner*—Teresa M. Bonk
(74) *Attorney, Agent, or Firm*—Hoffmann & Baron, LLP (57) ABSTRACT

The cycle counter is incorporated in a cable tie tool and provides an accurate count of the number of cable ties cut by the tool. The cycle counter includes a sensor which detects the displacement of the blade of the cable tie tool required to sever the strap of the cable tie. Alternatively, the sensor detects the condition of a component of the cable tie tool which indicates that the tool has cut the strap of a cable tie. The sensor generates a cut signal indicating that the strap of a cable tie has been cut. The cycle counter further includes summing devices for processing the cut signals and generating additional signals for transmission to a display device. The display device communicates to an operator the total number of cable ties severed by the cable tie tool. The display device also communicates to the operator the total number of selected cable ties severed by the cable tie tool.

10 Claims, 6 Drawing Sheets

U.S. PATENT DOCUMENTS

| | | |
|---|---|---|
| 6,134,508 A | 10/2000 | Brandt et al. |
| 6,206,053 B1 | 3/2001 | Hillegonds |
| 2002/0129866 A1* | 9/2002 | Czebatul et al. ......... 140/123.6 |

FOREIGN PATENT DOCUMENTS

| | | |
|---|---|---|
| EP | 1 564 146 A1 | 8/2005 |
| WO | WO 02/30751 A1 | 4/2002 |

OTHER PUBLICATIONS

Communication pursuant to Article 96(2) EPC, European Patent Office, European Patent Application No. 05 075 355.7-2302, Mar. 20, 2006.

* cited by examiner

CYCLE COUNTER FOR CABLE TIE TOOL

CROSS-REFERENCE TO RELATED APPLICATION

This patent application claims priority to and the benefit of U.S. Provisional Patent Application No. 60/544,472 filed in the U.S. Patent and Trademark Office (USPTO) on Feb. 13, 2004.

BACKGROUND OF THE INVENTION

The present invention relates generally to a tension and anti-recoil mechanism for a cable tie tool, and more specifically, to such a mechanism for limiting the tension applied to the cable tie by the tool and limiting the re-coil of the tool when the cable tie is cut.

Cable ties are used to bundle or secure a group of articles such as electrical wires or cables. Cable ties of conventional construction include a cable tie head and an elongate strap extending therefrom. The strap is wrapped around a bundle of articles and thereafter inserted through a passage in the head. The head of the cable tie typically supports a locking element which extends into the head passage allowing the strap to be inserted through the passage but preventing retraction of the strap through the passage in the head. Two longitudinally separated portions of the strap are thereby secured to the head to define a loop for holding together the group of articles.

In use, the installer manually places the tie about the articles to be bundled, inserts the strap through the head passage and then manually tightens the tie about the bundle. Further tightening of the cable tie, which increases the tension in the strap thereof, may be provided by a cable tie tool.

One type of such a cable tie tool includes a housing which is generally pistol-shaped where the housing has a barrel into which the strap may be inserted for application of the tension. The housing has a grip which depends from the barrel.

Typically, cable tie tool are most effective when new and during a reasonable period of use thereafter. After prolonged use of a cable tie tool, the effectiveness thereof normally decreases. Such decreased effectiveness may result from a reduction in the quality of the blade which is supported, typically within the cable tie tool, and displaced to cut the strap of the cable tie. Such a reduction in the quality of the blade normally results in decreased quality of the severing of the strap.

Decreased effectiveness of the cable tie tool from prolonged use thereof may also result in increased force being required to close the trigger mechanism of the cable tie tool. The trigger mechanism is mechanically coupled to the blade such that closure of the trigger mechanism is required to displace the blade sufficiently to cut the strap of the cable tie. Such closure of the trigger mechanism is typically provided by grasping of the trigger mechanism and grip of the cable tie tool within the hand of the operator and the hand being squeezed or closed to pivot the trigger mechanism toward, and possibly into direct engagement with, the grip. If such closure or squeezing is significantly resisted by trigger mechanism, which may result from the quality of the blade being reduced or from other factors, then the closing force required to be applied by the hand of the operator is increased. If the force required to be provided by the hand of the operator is sufficiently large, undesirable consequences to the hand of the operator may result, such as strain or fatigue thereof.

The amount of use of a cable tie tool is primarily dependent upon the number of cable ties which have been tensioned and cut by the tool. The actual number of such cable ties which have been tensioned and cut by a specific cable tie tool is normally not apparent from the tool itself. The date of manufacture of a specific cable tie tool will not necessarily provide an indication of the amount of use of the tool since a relatively new tool may have been extensively used to tension and cut a large number of cable ties. Conversely, a relatively old cable tie tool may have been rarely used to tension and cut a small number of cable ties. Accordingly, an accurate determination of the amount of actual use of a specific cable tie tool is normally difficult. Typically, a determination of the actual number of cable ties which have been tensioned and cut by a specific cable tie tool is made by estimate or not at all.

SUMMARY OF THE INVENTION

The cycle counter of the present invention is incorporated in a cable tie tool and provides an accurate count of the number of cable ties cut by the tool. The cycle counter includes a sensor which detects the displacement of the blade of the cable tie tool required to sever the strap of the cable tie. Alternatively, the sensor detects the condition of a component of the cable tie tool which indicates that the tool has cut the strap of a cable tie. The sensor generates a cut signal indicating that the strap of a cable tie has been cut.

The cycle counter includes a total summing device which communicates with the sensor such that the total summing device receives all of the cut signals generated by the sensor. The total summing device has a total adding device for adding all of the cut signals received from the sensor. The total summing device generates a total signal indicating the total number of all cut signals received from the sensor.

The cycle counter further includes a discrete summing device which communicates with the sensor such that the discrete summing device receives a selected portion of the cut signals generated by the sensor. The discrete summing device has a discrete adding device for adding all of the selected cut signals received from the sensor. The discrete summing device generates a discrete signal indicating the total number of the selected cut signals received from the sensor.

The cycle counter further includes a display device which communicates with the total and discrete summing devices such that the display device receives the total and discrete signals generated by the total and discrete summing devices, respectively. The display device generates a total display signal for communicating to an operator the total number of cable ties severed by the cable tie tool. The display device generates a discrete display signal for communicating to the operator the total number of selected cable ties severed by the cable tie tool.

The total display signal generated by the display device provides an indication of the total actual usage of the cable tool by showing the total number of cable ties which have been cut by the tool. This may be useful, for example, for determining the applicability of a warranty. The total actual usage may also be used for maintenance, for example, by indicating when the blade is due for replacement.

The discrete display signal generated by the display device provides an indication of the actual usage of the cable tool over a specific time period by showing the total number of cable ties which have been cut by the tool during such a time period. This information may be useful to the operator since it will provide the number of cable ties cut by the operator during the shift and assist the management of the production in the factory to determine the efficiency of the operator.

Actual cutting of a cable tie is normally required for the sensor to generate a cut signal. Movements of one or more components of the cable tie tool which may be associated with the cutting of a cable tie, such as pivoting or closure of the trigger mechanism, will normally not cause the sensor to generate a cut signal absent an actual cutting of a cable tie. This increases the accuracy of the total and discrete display signals since they normally provide the number of cable ties which were actually cut.

These and other features of the invention will be more fully understood from the following description of specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION OF THE INVENTION

Referring to the drawings and more particularly to FIGS. 1 to 6, a cycle counter 10 is shown incorporated in a cable tie tool 12 for counting the severing of a cable tie 14, having a strap 16 and head 18, to a bundle of articles, such as wires or cables. The cable tie tool 12 includes a barrel 20 and a grip 22 depending therefrom. The cable tie tool 12 includes a trigger mechanism 24 which is connected by a mechanical linkage to a cutting mechanism 26 located within the barrel 20 adjacent to the front end thereof. The cutting mechanism 26 typically includes a blade which is forcibly displaced to sever a portion of the strap 16 which is inserted into the barrel 20 through the front end thereof.

Figure 1:
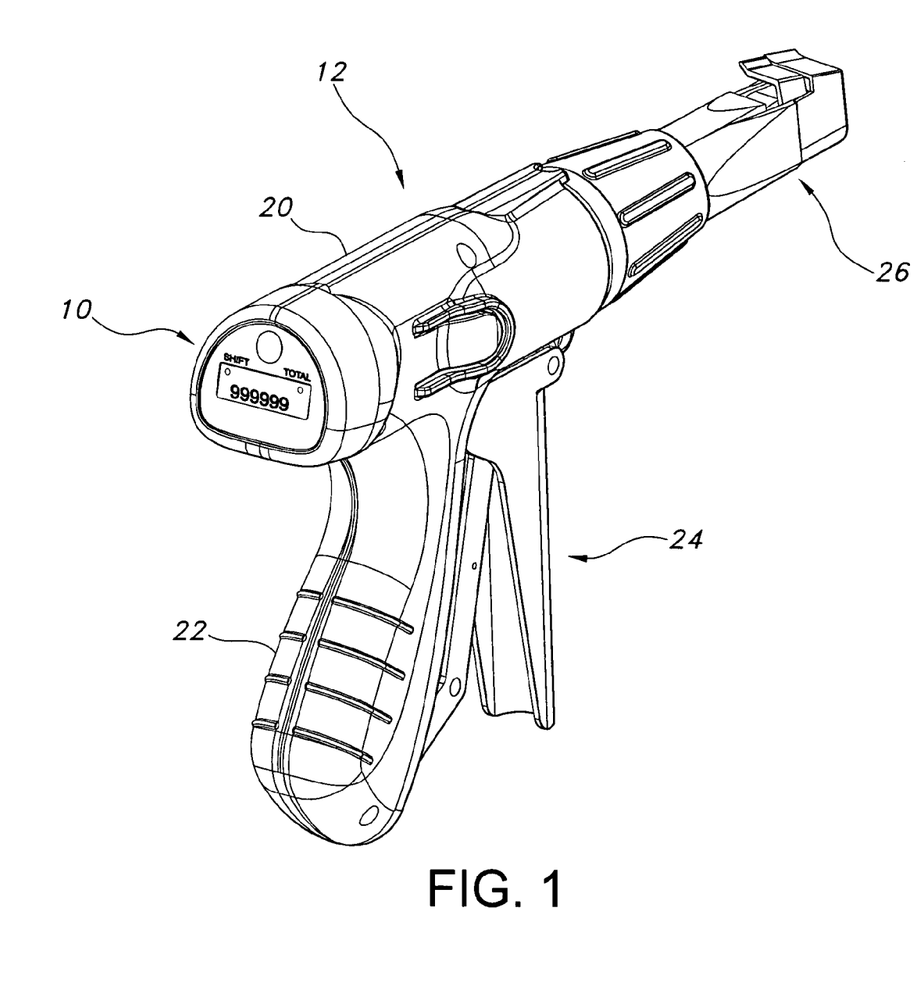
FIG. 1 is a rear perspective view of a cable tie tool which incorporates the cycle counter of the present invention.
Figure 2:
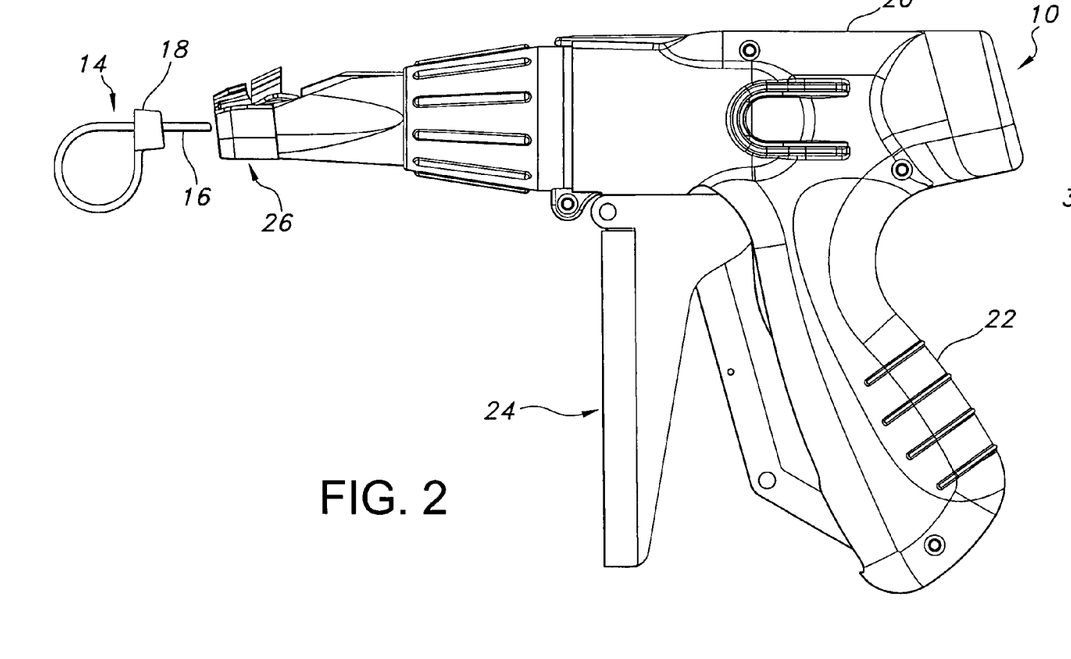
FIG. 2 is a side elevation view of the cable tie tool which incorporates the cycle counter of FIG. 1.
Figure 3:
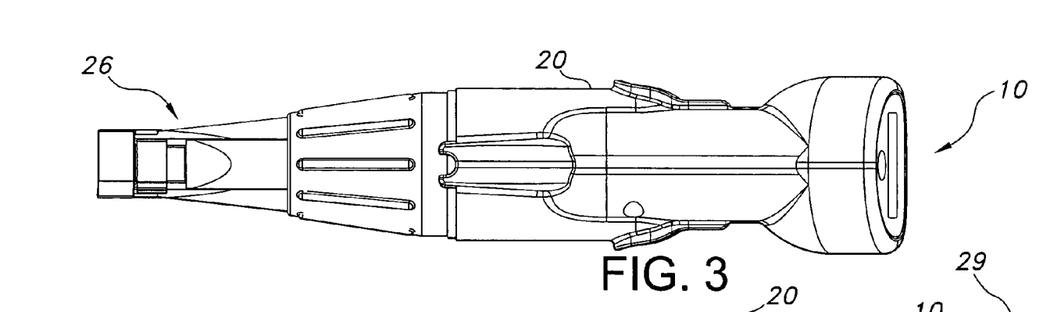
FIG. 3 is a top plan view of the cable tie tool which incorporates the cycle counter of FIG. 2.
Figure 4:
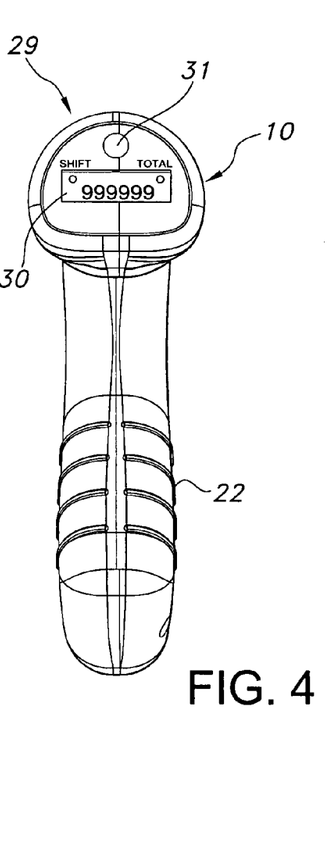
FIG. 4 is a rear elevation view of the cable tie tool which incorporates the cycle counter of FIG. 2.
Figure 5:
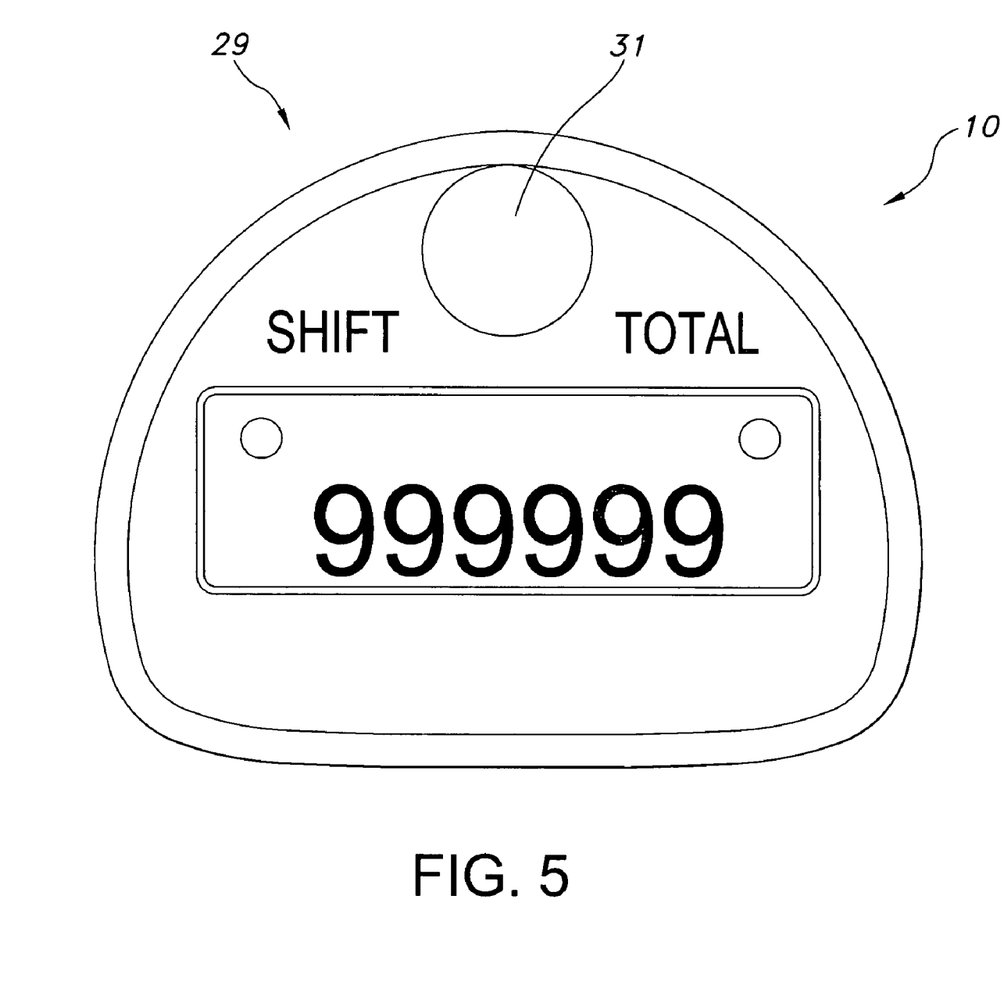
FIG. 5 is an enlarged view of the display panel of the cycle counter of FIG. 1.

The cycle counter 10 includes a sensor mounted within the cable tie tool 12. The sensor is coupled to the blade for detection of the complete displacement thereof for severing the strap of a cable tie. The sensor generates a cut signal indicating each displacement of the blade which is detected by the sensor. The sensor is constructed to sense, and thereby generate a corresponding cut signal, specific cuts made by the blade and not pivoting of the trigger mechanism 24, such as by squeezing thereof.

The cycle counter 10 further includes a total summing device mounted within the cable tie tool. The total summing device communicates with the sensor such that the total summing device receives all of the cut signals generated by the sensor. The total summing device has a total adding device for adding all of the cut signals received from the sensor. The total summing device generates a total signal indicating the total number of all of the cut signals received from the sensor. The total summing device may include a micro switch. Preferably, the total summing device may not be reset to zero so that the total number of straps 16 severed by the cable tie tool 12 may be determined. This information may be used to determine the amount of actual use of a specific cable tie tool 12.

The cycle counter 10 further includes a discrete summing device mounted within the cable tie tool. The discrete summing device communicates with the sensor such that the discrete summing device receives a selected portion of the cut signals generated by the sensor. The discrete summing device has a discrete adding device for adding all of the selected cut signals received from the sensor. The discrete summing device generates a discrete signal indicating the total number of the selected cut signals received from the sensor. The discrete summing device may include a micro switch.

The discrete summing device includes a reset device which communicates with the discrete adding device. The reset device is able to eliminate the total number of selected cut signals recorded by the discrete adding device such that the discrete summing device may total a subsequent number of selected cut signals and generate a discrete signal indicative thereof. The discrete summing device may thereby be reset to zero by the reset device. This enables determination of the total number of straps 16 severed by the cable tie tool 12 for a specific continuous period of time, such as during use of the cable tie tool by a specific operator. This information may be used to determine the amount of cable ties 14 severed by the operator or the rate at which the cable ties were severed. Also, this information may be used to determine the total number of cable ties 14 severed by the cable tie tool 12 during a specific shift. This capability of the cycle counter 10 may be referred to as a shift counter.

The cycle counter 10 includes a display device 29 mounted on the rear of the barrel 20, as shown in FIG. 1. The display device 29 communicates with the total and discrete summing devices such that the display device receives the total and discrete signals generated by the total and discrete summing devices, respectively. The display device 29 generates a total display signal for communicating to a user the total number of cable ties severed by the cable tie tool. The display device 29 generates a discrete display signal for communicating to a user the total number of selected cable ties severed by the cable tie tool. The display device 29 may include an LCD display 30 for displaying the total and discrete display signals as digits, such as by having a maximum number of 6.

The display device 29 includes a control button 31, which may be actuated by forcible depression thereof. Alternatively, the control button 31 may be heat sensitive and thereby actuated by contact thereof by the finger of the user. Actuation of the control button 31 causes the display device 29 to replace the display signal shown when the button is actuated, such as the total display signal, with the display signal not shown when the button is actuated, such as the discrete display signal. This provides for control of the cycle counter 10 by the control button 31 and a micro controller chip. The control button 31 may be actuated by a momentary push thereof for flip flop between the total summing device and discrete summing device.

The control button 31 is also connected to the reset device. Actuation of the control button in specific manner, such as by depressing the button for a minimum period of time when the display device 29 is showing the discrete display signal, causes the reset device to eliminate the total number of selected cut signals recorded by the discrete adding device. Actuating the control button 31, such as by pushing it, continuously will reset the cycle counter 10 to zero.

Figure 6:
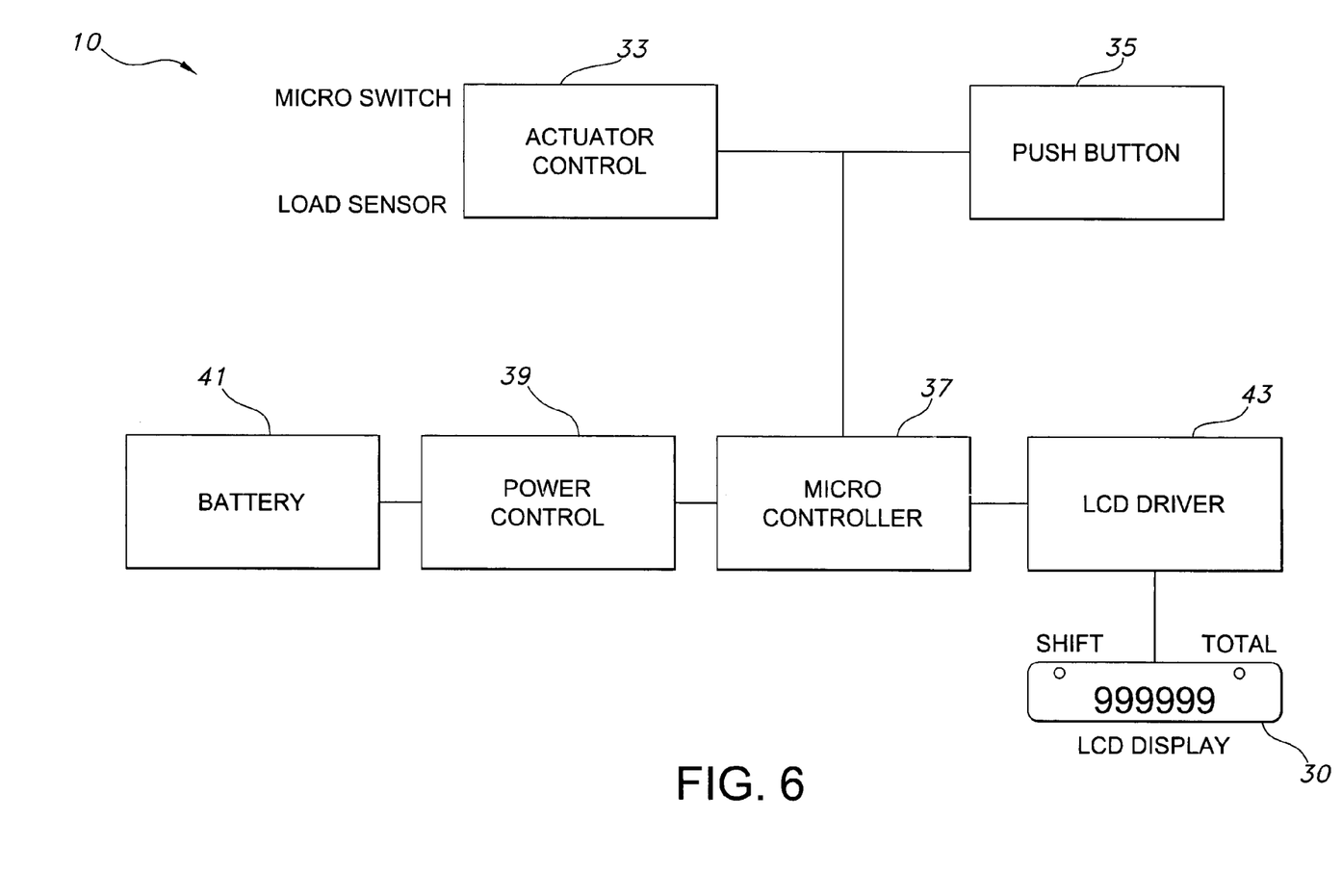
FIG. 6 is a schematic view of the components of the cycle counter of FIG. 1.

The control logic for the cycle counter 10 is shown in FIG. 6. The actuator control 33 and push button 35 are coupled to a micro controller 37. Adjacent to the actuator control 33 in FIG. 6 is an indication that the sensor may detect the displacement of the blade of the cable tie tool (such as by a MICRO-SWITCH), or the load in a component of the cable tie tool which indicates that the tool has cut the strap of a cable tie (such as by a LOAD SENSOR). Also, the actuator control 33 may receive a signal from a component which displaces the blade of the cable tie tool to cut the strap of a cable tie. Such displacement of the blade may be in the upward direction when the cable tie tool is in an upright orientation. The push button 35 corresponds to the control button 31 in FIGS. 4 and 5. The micro controller 37 is supplied by a power control 39 which, in turn, is supplied by a battery 41 such as a lithium battery. The micro controller 39 is coupled to an LCD driver 43 which controls an LCD display 30. The control logic illustrated in FIG. 6 provides electronic control of the cycle counter 10.

In an alternative embodiment of the sensor, the sensor may detect the tension in the strap of the cable tie instead of the displacement of the blade of the cutting mechanism 26. Such a load-sensitive sensor may be used with a device which produces a specific tension in the strap 16 of the cable tie 14 before severing thereof. Such a device is disclosed in U.S. Provisional Patent Application filed in the USPTO on even date herewith and entitled "Tension and Anti-Recoil Mechanism for Cable Tie Tool", having as the inventors Joey D. Magno, Jr., Johan Tapper, Anders Fahlen, Joakim Norin, Goran Paulsson, and Sven Wadling, and identified by the Attorney Docket No. 577-613. A sensor which is load sensitive would generate the cut signal when the specific tension indicative of severing of the strap 16 is detected therein.

In an alternative embodiment of the cycle counter 10, a mechanical counter may be coupled to the blade or another component of the cable tie tool 12 which translates when the strap 16 is severed. Such a mechanical counter may require more than one cable, linkage or other parts, any or all of which may require machining and assembly.

Figure 7:
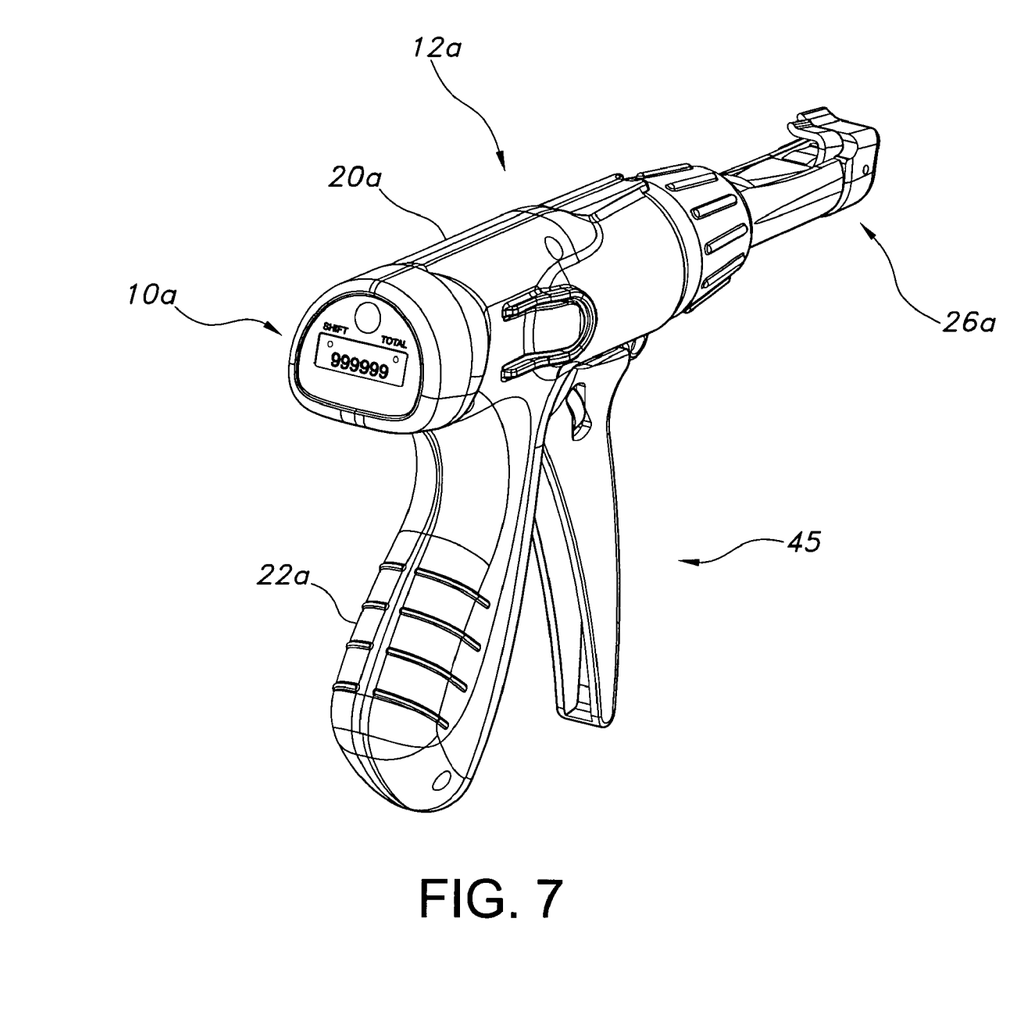
FIG. 7 is a rear perspective view of an alternative second embodiment of the cable tie tool which incorporates the cycle counter of FIG. 1.
Figure 8:
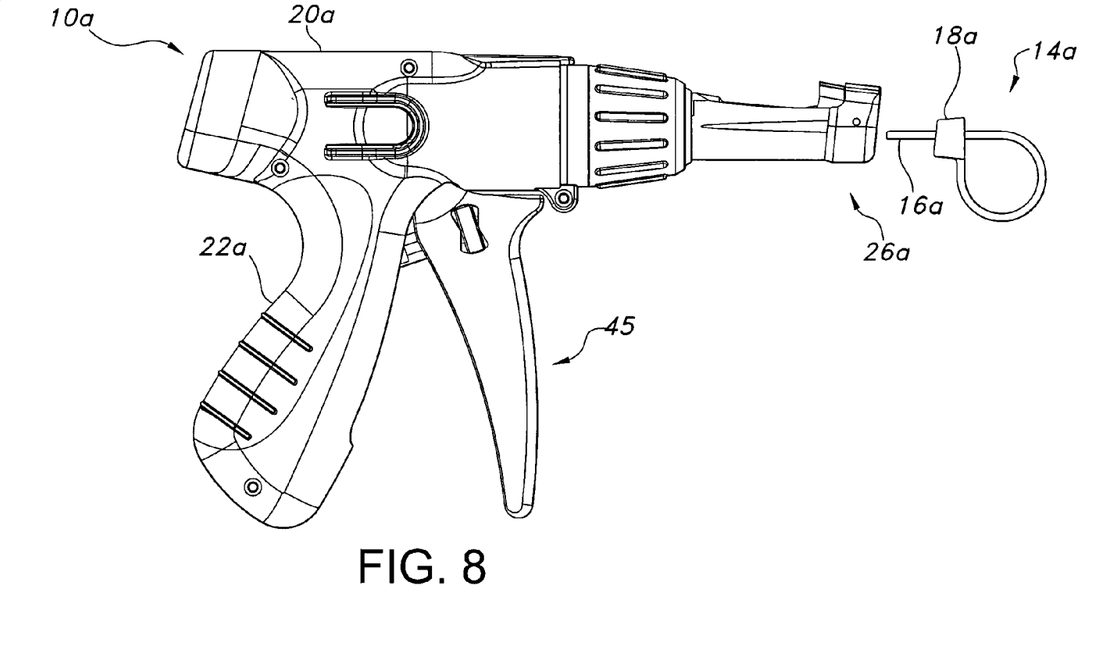
FIG. 8 is a side elevation view of the cable tie tool which incorporates the cycle counter of FIG. 7.
Figure 9:
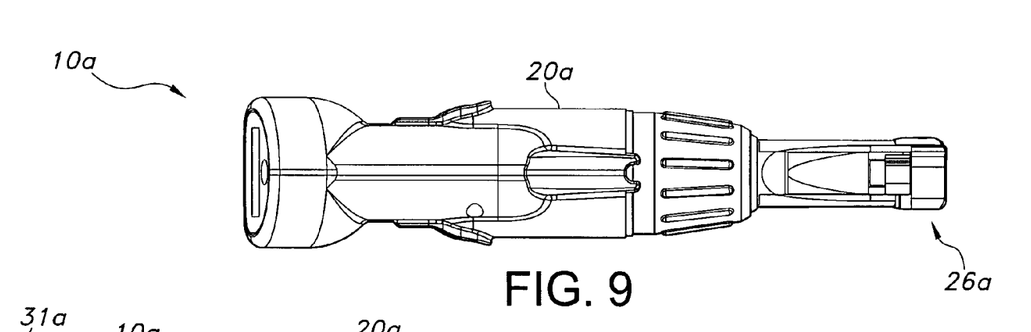
FIG. 9 is a top plan view of the cable tie tool which incorporates the cycle counter of FIG. 8.
Figure 10:
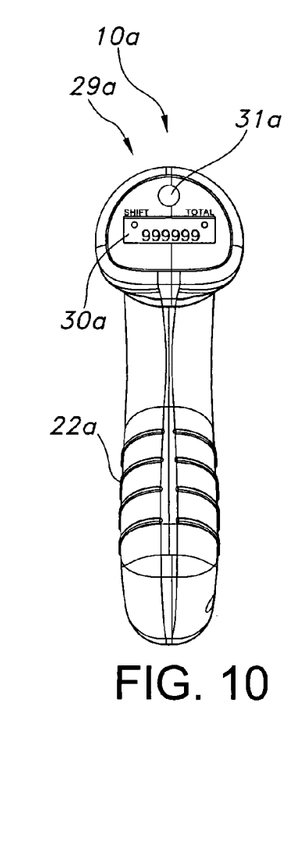
FIG. 10 is a rear elevation view of the cable tie tool which incorporates the cycle counter of FIG. 8.

An alternative embodiment of the cable tie tool 10a is shown in FIGS. 7 to 10. FIGS. 7 to 10 are views which correspond to the views of FIGS. 1 to 4, respectively. Parts shown in FIGS. 7 to 10 which correspond to parts shown in FIGS. 1 to 4 have the same reference numeral as in FIGS. 1 to 4 with the addition of the suffix "a" in FIGS. 7 to 10. The tool head 12a is generally the same as the tool head 12 shown in FIGS. 1 to 4. The tool handle 15a shown in FIGS. 7 to 10 includes a trigger mechanism 45 as shown in FIGS. 7 and 8.

The entire disclosure of U.S. Pat. No. 5,915,425 issued Jun. 29, 1999 is hereby incorporated by reference herein.

The entire disclosures of U.S. patent application Ser. No. 10/614,435 filed in the USPTO on Jul. 7, 2003, U.S. patent application Ser. No. 29/185,985 filed in the USPTO on Jul. 7, 2003 and U.S. patent application Ser. No. 29/185,986 filed in the USPTO on Jul. 7, 2003 are each hereby incorporated by reference herein. The entire disclosures of U.S. Provisional Patent Application No. 60/544,361 filed in the USPTO on Feb. 13, 2004, U.S. Provisional Patent Application No. 60/544,362 filed in the USPTO on Feb. 13, 2004, and U.S. Provisional Patent Application No. 60/544,472 filed in the USPTO on Feb. 13, 2004 are each hereby incorporated by reference herein. The entire disclosure of the U.S. patent application filed in the USPTO on even date herewith and entitled "Cable Tie Tool Having Modular Tool Head", having as the inventor Joey D. Magno, Jr., Johan Tapper, Anders Fahlen, Joakim Norin, Goran Paulsson, and Sven Wadling, and identified by the Attorney Docket No. 577-609 is hereby incorporated by reference herein. The entire disclosure of the U.S. patent application filed in the USPTO on even date herewith and entitled "Tension and Anti-Recoil Mechanism for Cable Tie Tool", having as the inventors Joey D. Magno, Jr., Johan Tapper, Anders Fahlen, Joakim Norin, Goran Paulsson, and Sven Wadling, and identified by the Attorney Docket No. 577-613 is hereby incorporated by reference herein.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A cable tie tool assembly comprising:
   a cable tie tool having a grip which provides a base thereto such that said cable tie tool assembly can be positioned by locating said grip, said grip being configured for grasping by a hand of a user of said cable tie tool assembly for said locating of said grip; and
   a cycle counter incorporated in said cable tie tool such that said cycle counter is positioned concomitantly with said positioning of said cable tie tool assembly,
   said cycle counter comprising a sensor mounted within the cable tie tool, said sensor being able to detect the complete displacement of a blade of the cable tie tool for severing a cable tie, said sensor generating a cut signal indicating each displacement of the blade which is detected by said sensor,
   said cycle counter further comprising a summing device mounted within the cable tie tool, said summing device communicating with said sensor such that said summing device receives said cut signals generated by said sensor, said summing device having an adding device for adding said cut signals received from said sensor, said summing device generating a total signal indicating the total number of cut signals received from said sensor,
   said cycle counter further comprising a display device mounted on the cable tie tool, said display device communicating with said summing device such that said display device receives said total signal generated by said summing device, said display device generating a display signal for communicating to an operator the total number of cable ties severed by the cable tie tool.

2. A cycle counter for a cable tie tool, comprising:
   a sensor mounted within the cable tie tool, said sensor being able to detect the complete displacement of a blade of the cable tie tool for severing a cable tie, said sensor generating a cut signal indicating each displacement of the blade which is detected by said sensor a summing device mounted within the cable tie tool, said summing device communicating with said sensor such that said summing device receives said cut signals generated by said sensor, said summing device having an adding device for adding said cut signals received from said sensor, said summing device generating a total signal indicating the total number of cut signals received from said sensor; and a display device mounted on the cable tie tool, said display device communicating with said summing device such that said display device receives said total signal generated by said summing device, said display device generating a display signal for communicating to an operator the total number of cable ties severed by the cable tie tool, said summing device comprising:

a total summing device which communicates with said sensor such that said total summing device receives all of said cut signals generated by said sensor, said total summing device having a total adding device for adding all of said cut signals received from said sensor, said total summing device generating a total signal indicating the total number of all cut signals received from said sensor; and a discrete summing device which communicates with said sensor such that said discrete summing device receives a selected portion of said cut signals generated by said sensor, said discrete summing device having a discrete adding device for adding all of said selected cut signals received from said sensor, said discrete summing device generating a discrete signal indicating the total number of said selected cut signals received from said sensor;

said display device communicating with said total and discrete summing devices such that said display device receives said total and discrete signals generated by said total and discrete summing devices, respectively, said display device generating a total display signal for communicating to an operator the total number of cable ties severed by the cable tie tool, said display device generating a discrete display signal for communicating to the operator the total number of selected cable ties severed by the cable tie tool.

3. A cycle counter according to claim 2, wherein said display device comprises a control button connected to said display device such that actuation of said control button when said total display signal is shown by said display device causes said display device to replace said total display signal with said discrete display signal, actuation of said control button when said discrete display signal is shown by said display device causing said display device to replace said discrete display signal with said total display signal.

4. A cycle counter according to claim 2, wherein said discrete summing device comprises a reset device communicating with said discrete adding device, said reset device being able to eliminate the total number of selected cut signals recorded by said discrete adding device such that said discrete summing device may total a subsequent number of selected cut signals and generate a discrete signal indicative thereof.

5. A cycle counter according to claim 4, wherein said display device comprises a control button connected to said display device such that actuation of said control button when said total display signal is shown by said display device causes said display device to replace said total display signal with said discrete display signal, actuation of said control button when said discrete display signal is shown by said display device causing said display device to replace said discrete display signal with said total display signal, said control button being connected to said reset device such that actuation of said control button when said discrete display signal is shown by said display device causes said reset device to eliminate the total number of selected cut signals recorded by said discrete adding device.

6. A cycle counter according to claim 1, wherein said cable tie tool includes a barrel from which said grip depends, said blade being located within said barrel, said cable tie tool having a trigger mechanism which is connected by a mechanical linkage to said blade such that displacement of said trigger mechanism causes said displacement of said blade, said display device being mounted on the rear surface of the barrel.

7. A cycle counter according to claim 5, wherein said elimination of the total number of selected cut signals by said reset device requires said actuation of said control button in a specific manner when said discrete display signal is shown by said display device.

8. A cycle counter according to claim 7, wherein said specific manner comprises depressing said control button for a minimum period of time.

9. A cable tie tool assembly comprising:

a cable tie tool having a grip which provides a base thereto such that said cable tie tool assembly can be positioned by locating said grip, said grip being configured for grasping by a hand of a user of said cable tie tool assembly for said locating of said grip, said cable tie tool tensioning the strap of a cable tie and subsequently severing the strap, the severing of the strap resulting in a decrease in the tension in the strap; and a cycle counter incorporated in said cable tie tool such that said cycle counter is positioned concomitantly with said positioning of said cable tie tool assembly, said cycle counter comprising a sensor mounted within the cable tie tool, said sensor being able to detect the decrease in the tension in the strap of the cable tie, said sensor generating a cut signal indicating each decrease in the tension in the strap which is detected by said sensor, said cycle counter further comprising a summing device mounted within the cable tie tool, said summing device communicating with said sensor such that said summing device receives said cut signals generated by said sensor, said summing device having an adding device for adding said cut signals received from said sensor, said summing device generating a total signal indicating the total number of cut signals received from said sensor, said cycle counter further comprising a display device mounted on the cable tie tool, said display device communicating with said summing device such that said display device receives said total signal generated by said summing device, said display device generating a display signal for communicating to an operator the total number of cable ties severed by the cable tie tool.

10. A cycle counter for a cable tie tool which tensions the strap of a cable tie and subsequently severs the strap, the severing of the strap resulting in a decrease in the tension in the strap, said cycle counter comprising:

a sensor mounted within the cable tie tool, said sensor being able to detect the decrease in the tension in the strap of the cable tie, said sensor generating a cut signal indicating each decrease in the tension in the strap which is detected by said sensor;

a summing device mounted within the cable tie tool, said summing device communicating with said sensor such that said summing device receives said cut signals generated by said sensor, said summing device having an adding device for adding said cut signals received from said sensor, said summing device generating a total signal indicating the total number of cut signals received from said sensor; and a display device mounted on the cable tie tool, said display device communicating with said summing device such that said display device receives said total signal generated by said summing device, said display device generating a display signal for communicating to an operator the total number of cable ties severed by the cable tie tool, said summing device comprising a total summing device which communicates with said sensor such that said total summing device receives all of said cut signals generated by said sensor, said total summing device having a total adding device for adding all of said cut signals received from said sensor, said total summing device generating a total signal indicating the total number of all cut signals received from said sensor; and a discrete summing device which communicates with said sensor such that said discrete summing device receives a selected portion of said cut signals generated by said sensor, said discrete summing device having a discrete adding device for adding all of said selected cut signals received from said sensor, said discrete summing device generating a discrete signal indicating the total number of said selected cut signals received from said sensor;

said display device communicating with said total and discrete summing devices such that said display device receives said total and discrete signals generated by said total and discrete summing devices, respectively, said display device generating a total display signal for communicating to an operator the total number of cable ties severed by the cable tie tool, said display device generating a discrete display signal for communicating to the operator the total number of selected cable ties severed by the cable tie tool.

* * * * *